July 26, 1932.   A. L. ELLIS   1,868,697
MACHINE TOOL
Filed April 4, 1930   3 Sheets-Sheet 1
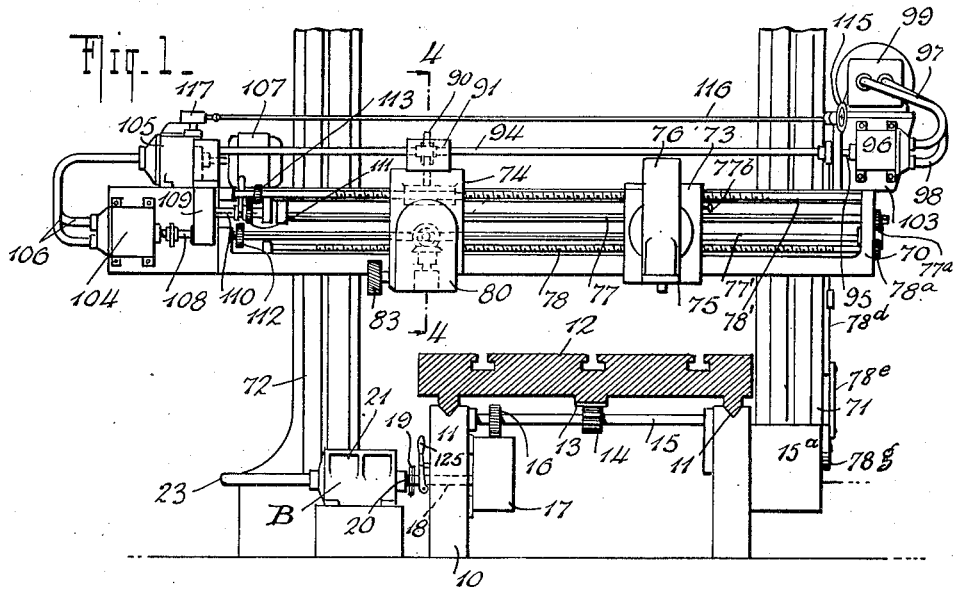
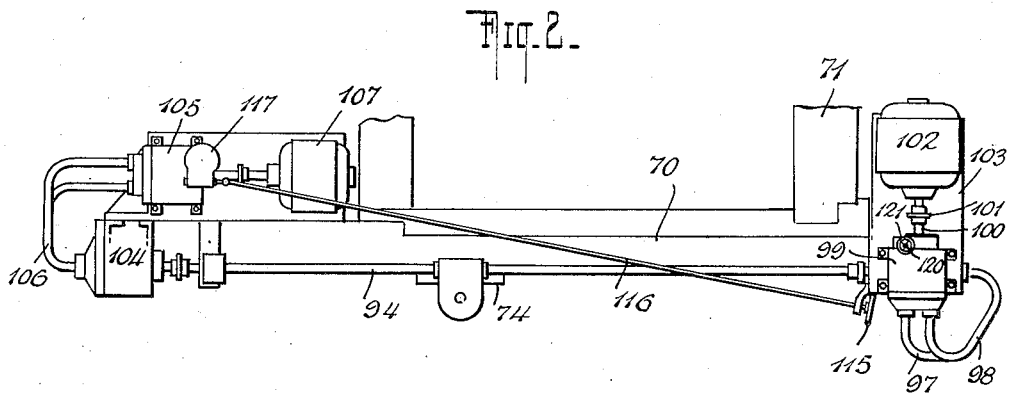
INVENTOR
ARTHUR L. ELLIS
BY
ATTORNEYS

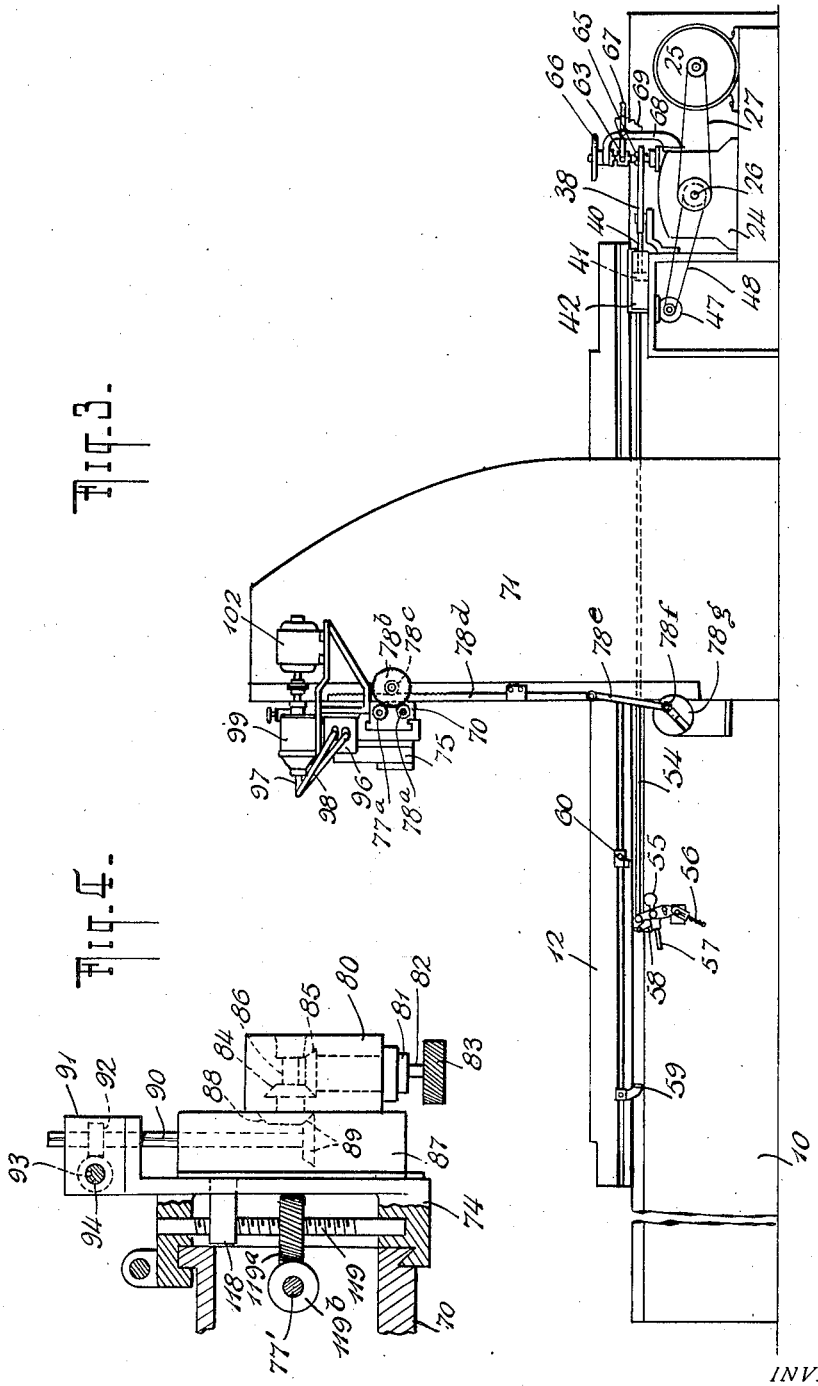

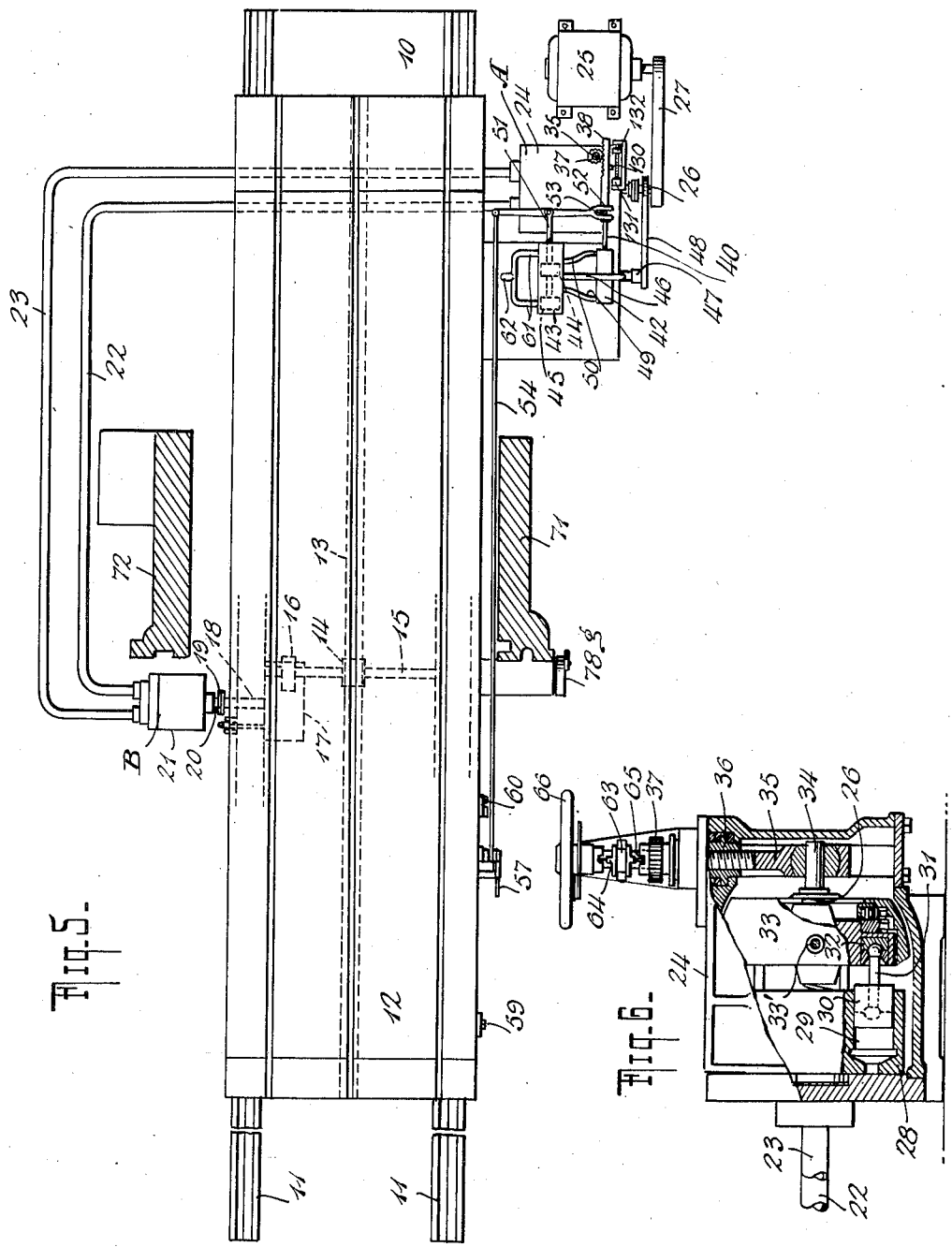

Patented July 26, 1932

1,868,697

UNITED STATES PATENT OFFICE

ARTHUR L. ELLIS, OF NEW ROCHELLE, NEW YORK, ASSIGNOR TO THE WATERBURY TOOL COMPANY, OF WATERBURY, CONNECTICUT, A CORPORATION OF CONNECTICUT

MACHINE TOOL

Application filed April 4, 1930. Serial No. 441,450.

This invention relates to machine tools and has for its principal object to provide a new and improved construction for a combined planer and milling machine. It has heretofore been proposed to combine a milling machine head with the well-known machine shop planer, so that the combined machine may be used either as a planer or as a milling machine, as desired. Machines of this type as heretofore constructed or proposed, however, have included either a very complicated system of gearing for operating the planer table at the slow speeds required for milling machine work, or an electric motor with a complicated system of electric rheostats or variable resistances to secure the desired operation of the planer table at the widely different speeds required for planing and for milling machine work respectively. In view of the intricate or complicated nature of the speed changing arrangements heretofore proposed for combined planing and milling machines, such machines have not proven entirely satisfactory nor have they gone into wide, general use. Another difficulty with combined machines of the type referred to, as heretofore proposed, has been that of securing a sufficient flexibility of speed changes to enable the combined machine to work satisfactorily upon all types and conditions of work. One important object of my invention is to overcome the difficulties mentioned above.

Another principal object of the present invention is to provide a new and improved construction for a combined planer and milling machine, in which an infinite variation of speed changes within the speed limits of the drive may be secured, and in which complicated gears and troublesome variable electrical resistances are entirely eliminated.

Considered more specifically the object of the present invention is to provide a new and improved construction of a combined planer and milling machine in which the drive of the machine is effected by means of hydraulic gears, while a further object is to provide a hydraulic speed gear drive for a combined planer and milling machine in which the planer table is driven by a rotary hydraulic motor and not by a cylinder and piston. A hydraulic drive of the cylinder and piston type has been used heretofore in connection with a planer table, but has not proven entirely satisfactory in practice because of the difficulty experienced in entirely eliminating jerky motion. It is essential for the successful operation of a milling machine, and also of a planer, that the travel of the work table be effected with the smoothest possible motion. It is therefore another object of the present invention to provide a construction in which jerky motion of the table is entirely eliminated and a smooth travel thereof is assured.

The above and other objects of the present invention will appear more fully from the following detailed description and by reference to the accompanying drawings forming a part hereof, wherein Fig. 1 is a front elevation of a machine constructed in accordance with the principles of the present invention; Fig. 2 is a plan view of the cross head shown in Fig. 1; Fig. 3 is a side elevation of the machine; Fig. 4 is a section on the line 4—4 of Fig. 1; Fig. 5 is a plan view of the machine and Fig. 6 is an elevation partly in section of one of the hydraulic gear units.

In the drawings the numeral 10 indicates the usual bed of a planer provided in accordance with the usual construction with the ways 11 on which the work table 12 is slidably mounted. The under side of the table 12 is provided with the usual rack 13 with which is adapted to engage a driving pinion 14. In the particular constructional example disclosed, the pinion 14 is secured upon a cross shaft 15 which also has secured to it, adjacent to one end thereof, a pinion 16. The latter meshes with the gears of a suitable gear reduction indicated diagrammatically in the drawings by the reference character 17. The gear reduction 17 may be of any suitable construction in which a straight one-to-one drive is delivered through the gear reduction, or a relatively large reduction in speed ratio may be secured. Gear reductions of this particular type are well known and in fact may be purchased in the open market; the constructional details thereof form no part of the present invention and need not be described. The input shaft 18 of the gear reduction 17 is connected by means of a suitable coupling 19 with the driving shaft 20 of a fluid pressure motor 21 or B-end, as it is called in the art, of a Waterbury hydraulic speed gear.

Fuid under pressure is circulated through the fluid pressure motor 21 by means of the pipes 22, 23 which connect said motor with the A-end or pump 24 of a Waterbury gear. The pump 24 is driven by any suitable means such, for example, as the electric motor 25, which preferably is of uniform speed and which drives the shaft 26 of the pump 24 by means of a belt 27.

The constructional details of the Waterbury type hydraulic gears form no part of the present invention; but in order that the operation of such devices may be more clearly understood, and in order that the present disclosure may be more nearly complete, a brief description of the Waterbury type gear is given. Said gear consists essentially of a pump and a motor, the pump usually being known as the A-end and the motor as the B-end. The construction of the pump and motor is similar, and each comprises a rotating cylinder block 28 (Fig. 6) having a plurality of cylinders 29 therein, in each of which cylinders a piston 30 is mounted for reciprocation. Each piston 30 is connected by means of a rod 31 with a swash plate 32 mounted for rotation in a suitable race provided in a box 33. In the motor, the said box is ordinarily held at a fixed angle of inclination to the driving shaft (20), while in the pump, box 33 is a tilting box, the angle of inclination of which to the driving shaft (26) may be varied as desired. For this purpose the tilting box of the pump is provided, out of line with the said shaft, with a longitudinal projection or stub 34 to which is connected the lower end of a vertically sliding control rod 35 provided with a threaded portion which engages with a threaded nut or sleeve 36 held against longitudinal movement but rotatable in the casing of the pump, so that when the nut is rotated longitudinal movement will be imparted to the control rod 35 to alter or adjust the inclination of the tilting box by swinging it about its pivot axis 33'. When the tilting box is at right angles to the axis of rotation of the pump, as shown in Fig. 6, the pump pistons have no stroke and no fluid is propelled by the pump. This is called the neutral position. When the tilting box of the pump is moved in either direction from the neutral position, fluid will be circulated by the pump through the motor. The direction and extent of inclination of the tilting box governs the direction of flow of the fluid from the pump and the rate of the pump's output. As the output of the pump is varied, the fluid propelled thereby through the pipes 22, 23 will cause the driving shaft of the motor to be rotated at a speed determined by the setting of the tilting box and swash plate of the pump.

In Figs. 5 and 6 of the drawings, the rotatable nut 36 of the pump 24 is shown as carrying loosely (rotatably) a pinion 37 with which meshes a rack 38 supported for reciprocation in suitable guides carried by the pump casing. Connected to one end of the rack 38 is a piston rod 40 (Fig. 3) of a piston 41 mounted within a cylinder 42. Fluid under pressure is delivered to the opposite ends of the cylinder 42 under the control of a valve located in a casing 43 (Fig. 5). Mounted in said casing is a piston type valve having the two heads 44, 45. Fluid under pressure is delivered to the center of the valve casing 43 through the pipe 46 from a small pump 47 which preferably is of the gear type and is driven by a belt 48 from the driving shaft 26 of the pump or A-end 24. The ends of the cylinder 42 are connected to the valve casing 43 by pipes 49, 50. The heads 44, 45 have a valve rod 51 which, at its outer end, is pivotally connected to a swinging lever 52. One end of the lever 52 is forked for engagement with a pin 53 which projects from the rack 38. To the other end of the lever 52 is pivotally connected one end of a connecting rod or link 54. The other end of the rod 54 is connected to a trip lever 55 of the planer. This trip lever 55 is constructed as a toggle jointed member having a spring 56 which tends to throw the toggle joint of the lever over the dead center. The lever 55 also includes a handle portion 57 by means of which the operator may actuate the lever, and a pivoted pawl 58 adapted to be engaged by the planer dogs 59 and 60.

From the above description of the rack 38 and the associated parts it will be seen that when the toggle lever 55 is thrown to a position such as shown in Fig. 3 of the drawings, the rod 54 will be pulled forwardly or to the left, thereby imparting a similar movement to the valve rod 51 and valve heads 44, 45, the lever 52 pivoting on the pin 53 of the rack 38 as a fulcrum during the above described movement. When the valve is moved to this position, fluid from the pump 47 passes from the pipe 46 through the valve casing in the space between the valve heads 44, 45 to flow by the pipe 49 to the left hand end of the cylinder 42, thereby causing the piston 41 to move towards the right and carry with it the rack 38. The rack 38, through its engagement with the pinion 37, will produce a rotation of the nut 36 of the control rod 35 to adjust the latter so that fluid will be pumped by the pump 24 to the B-end or motor 21 in a direction such as to cause the planer table 12 to travel from left to right to perform a working stroke. As the piston 41 and rack 38 are moved towards the right in the manner just described, the lever 52 will pivot upon the point at which it is pivoted to the end of the connecting rod 54, thus causing the valve heads 44, 45 to be moved towards the right to its neutral position, and cutting off the flow of fluid to the cylinder 42. When the planer reaches the end of its working stroke as determined by the adjustment of the dog 59, the latter will engage the toggle lever 55 and move it towards the right thereby producing a movement of the valve heads 44, 45 such as will establish communication between the pipes 46 and 50, thereby causing the piston 41 to be moved to the left to bring about, through the rack 38 and pinion 37, a rotation of the nut 36 of the pump and such a movement of the pump's control rod 35 as will cause the direction of flow of the fluid from the pump 24 to the motor 21 to be reversed.

It will be noted that the valve casing 43 has connected to the opposite ends thereof, a pair of branch pipes 61 which in turn are connected by the pipe 62 to the suction side of the small gear pump 47. The arrangement of the pipes 49 and 50 relatively to the pipes 61 is such that when the valve heads 44, 45 have been moved to the extreme left hand position, communication is established through the valve casing between the pipe 50 and the right hand branch 61, while when the valve heads 44, 45 are moved to the extreme right hand position, communication is established between the pipe 49 and the left hand branch pipe 61, thereby permitting fluid to be exhausted from either end of the cylinder 42 when fluid is being delivered under pressure to the other end thereof.

When the machine is to be used as a planer, the table 12 will be reciprocated in the usual manner. The movement of the table 12 and the reversal thereof at the end of its working and idle strokes will therefore be effected by the planer dogs 59, 60 and the movement by said dogs of the toggle lever 55, the valve 44, 45 and piston 41 with the rack 38 and pinion 37. When, however, the machine is to be used for milling operations, the reversal or reciprocation of the table 12 which characterizes the use of the tool of the planer is of course not resorted to, but the table 12 is caused to be fed forwardly at a slow speed, according to the nature of the work to be performed. Means are therefore provided to enable the reversing mechanism above described to be rendered operative or inoperative as desired, and also to enable the speed of the hydraulic gear, consisting of the pump 24 and motor 21, to be set for milling work. This means comprises a clutch member 63 mounted to slide lengthwise upon an extension 64 of the control nut 36 of the pump, but held to rotate with said nut. This clutch member is provided with clutch teeth on its top and bottom faces. The lower clutch teeth are adapted to be engaged with a clutch face 65 upon the pinion 37 which is rotatably mounted on said extension 64, while the clutch teeth on the upper face of the clutch member are adapted to engage with a clutch face provided on the lower end of a hand wheel 66 also rotatable on the extension 64. The pinion 37 and the hand wheel 66 have no longitudinal movement relatively to the nut 36 and its extension 64. Movement of the clutch member 63 into and out of engagement with the pinion 37 and the hand wheel 66 is effected by means of a clutch lever 67 pivoted upon a bracket 68, the latter being suitably secured to the casing of the pump 24. The lever 67 is preferably provided with a spring pressed pawl or latch adapted to engage with a toothed segment 69 whereby the lever 67 and clutch member 63 may be locked with said member in either its upper or lower position, or in its intermediate or neutral position.

The machine includes a cross head 70 in accordance with the usual construction of planers, mounted for vertical adjustment upon a pair of uprights 71, 72. Carried by the cross head 70 and slidable thereon horizontally is a planer head 73 and a milling head 74. The planer head is of the usual construction of devices of this character and includes a pivoted apron 75 in which the planer tool is adapted to be clamped in the well known manner. The apron 75 is carried by a vertical slide 76 to which movement may be imparted from a cross shaft 77. Transverse or horizontal movement may be imparted to the planer head 73 from a cross feed screw 78 in the usual manner. The feed screw is shown as carrying a pinion $78^a$ in mesh with a gear wheel $78^b$. By the pawl-and-ratchet mechanism (not shown) which is usual in planer heads of this type, the gear wheel $78^b$ is connected with a pinion $78^c$ on the same shaft, and this pinion meshes with a vertically-movable rack $78^d$ to which an up-and-down movement is imparted in the customary manner, in correspondence to the movement of the planer table 12, as by a link $78^e$ and an adjustable crank pin $78^f$ on a disk $78^g$ driven from the planer table mechanism by the customary gearing (indicated at $15^a$). It will be understood that the wheel $78^b$ will rotate only when the rack $78^d$ moves in one direction, and will remain stationary when the rack moves in the opposite direction. The connection of the feed screw 78 with the planer head 73 is made by the usual nut (not shown) mounted on said head and movable into and out of engagement with the feed screw. The gear wheel $78^b$ also engages a pinion $77^a$ on the splined cross shaft 77 controlling the vertical movement of the slide 76 by intermediate mechanism (not shown) of the customary type, and preferably this intermediate mechanism includes a clutch, the actuating button of which is indicated at 77ᵇ, enabling the operator to establish or interrupt the connection of the splined shaft 77 with the device which effects the upward or downward movement of the slide 76.

The milling head 74 as shown most clearly in Fig. 4 comprises an outer housing 80 having a socket 81 mounted therein, in which is adapted to be received a mandrel 82 on which a milling tool 83 may be secured. Rotation is imparted to the socket 81 by any suitable gearing such, for example, as the bevel gears 84, 85 located within the housing 80. The bevel gear 85 is suitably connected to the socket 81, and the bevel gear 84 is fixed upon a shaft 86 mounted for rotation in suitable bearings provided within the housing. The shaft 86 also serves as a pivot upon which the housing may be swung to adjust the position of the milling cutter 83 relatively to the work, it being understood that suitable bolts are provided for locking the housing in adjusted position. In Fig. 1 the housing 80 has been shown in a position in which the axis of rotation of the milling cutter extends horizontally, while in Fig. 4 the axis of rotation of the cutter 83 is vertical. The shaft 86 projects into a vertical slide 87 of the milling head 74 and has fixed to its inner end a bevel gear 88 which meshes with a bevel gear 89 secured to the lower end of a vertical shaft 90, which projects at its upper end into a housing 91 and has secured to it within said housing a worm gear 92. A worm 93 meshes with the worm gear 92 and said worm 93 is mounted to slide on a splined shaft 94 which extends across the top of the cross head 70.

The shaft 94 is connected by a suitable coupling to the driving shaft 95 of a small Waterbury B-end or motor 96 through which fluid is circulated by way of the pipes 97, 98 from an A-end or pump 99, having its driving shaft 100 connected by a suitable flexible coupling 101 to a small electric motor 102. The pump 99 and motor 102 are mounted upon a bracket or platform 103 carried by the cross head 70.

The vertical feed of the milling tool is effected by means of a splined shaft 77′, and the transverse or horizontal feed of said tool is obtained by means of a screw shaft 78′ co-operating with a nut of customary character (not shown) mounted on the milling head 74. The driving means for the said shafts 77′ and 78′ consists of a Waterbury gear comprising a B-end 104 and an A-end 105 mounted upon the left hand end of the cross head 70, fluid being circulated through such B-end from the pump or A-end 105 by way of the pipes 106. The pump 105 is driven by a small electric motor 107. Connected to the driving shaft of the motor 104 is the input shaft 108 of a gear reduction 109, mounted upon the cross head 70 adjacent to the motor 104. The output shaft 110 of the gear reduction 109 carries a sliding gear 111 which is adapted to be moved into meshing engagement with a gear 112 carried by the shaft 77′ for effecting the vertical feed of the milling tool. The gear 111 may also be slid into engagement with a gear 113 secured to the shaft 78′ which effects the transverse or horizontal feed of the milling head 74. The gears 112, 113 are so spaced that the sliding gear 111 may be placed (as shown in Fig. 1) in a position between the two gears 112, 113 and out of engagement with both of them. Each tool head 73, 74 is provided with a split nut which as stated above may be thrown into or out of engagement with the threads of the feed screw 78, 78′ in accordance with the construction usually employed in machine tools of the character to which the present invention relates. Adjustment of the speed of rotation of the speed gear which consists of the A-end 105 and B-end 104 for driving the feed screw 78′ of the milling head is effected by means of a hand wheel 115 located adjacent to the right hand end of the machine in a position within easy reach of the operator stationed at the usual operating side of the machine tool. The hand wheel 115 is secured to a cross shaft 116 which extends across the machine above the cross head 70 and is connected by any suitable gearing contained within a housing 117 to the control device for the A-end 105. The slide 87 of the milling head 74 is mounted for vertical movement upon said head 74 and is provided with a nut 118 engaging a rotatable screw 119. The screw 119 carries rigidly a helical gear 119ᵃ with which meshes a corresponding helical gear 119ᵇ carried upon the shaft 77′.

The control device 120 (Fig. 2) for the A-end or pump 99 of the speed gear which drives the milling cutter is provided with a small hand wheel 121 by means of which the operator may set the control device 120 to the desired position.

The operation of the machine as a whole is as follows: Let it be assumed that it is desired to use the machine for a milling operation and that the electric motor 25 is rotated at a uniform rate of speed as hereinbefore set forth. The operator will adjust the gear reduction 17, by means of the operating handle 125, so as to throw in the back gear. The clutch member 63 is thrown into engagement with the clutch face upon the control hand wheel 66. The operator will then adjust the control rod 35 for the main A-end or pump 24 by means of the hand wheel 66 to secure a rotation of the driving shaft of the main B-end or motor 21 at the desired speed, according to the nature of the work to be done.

The characteristics of the hydraulic speed gear employed are such that a very accurate setting of the driving speed may be secured. The rate of feed or travel of the table 12 can therefore be made as slow as desired. The motor 102 is placed in operation and fluid is pumped from the A-end or pump 99 to the B-end or motor 96 thereby producing a rotation of the shaft 94 at a speed dependent upon the setting of the control device 120 of the pump 99. Rotation of the shaft 94 is communicated to the milling cutter 83 through the worm 93, worm gear 92, shaft 90, bevel gears 88, 89 and 84, 85, as will be readily understood.

If the operation to be performed is such that it is desired to effect either a vertical or horizontal feed of the cutter 83 relatively to the cross head 70, the electric motor 107 for the A-end or pump 105 is energized and the control device of said pump 105 is set to secure the desired speed of rotation of the driving shaft of the B-end or motor 104. Obviously, if it is desired to feed the milling head 74 transversely on the cross head 70, the sliding gear 111 is placed in meshing engagement with the gear 113 upon the feed screw 78', and the split nut of the cross head 74 is placed in meshing engagement with the threads of said feed screw. If a vertical feed of the milling cutter 83 is desired, the gear 111 is placed in meshing engagement with the gear 112.

When the machine is to be used for a planing operation, the clutch member 63 is placed in engagement with the clutch face 65 of the pinion 37. The reversal of the table 12 at each end of its stroke is effected by the setting of the dogs 59, 60 in the usual and well known manner, and reversal of direction of rotation of the main B-end or motor 21 is effected through the piston 41, cylinder 42 and rack 38 as controlled by the operation of the valve 43, which in turn is actuated from the toggle lever 55 and connecting rod 54 in the manner hereinbefore described. It will be understood, however, that when the table is used for a planing operation, the back gear of the reduction 17 is thrown out so that a direct one-to-one drive from the driving shaft 20 of the B-end or motor 21 to the pinion 14 is effected. The rack 38 is preferably provided with a projecting pin 130 adapted to co-operate with adjustable stops 131, 132 by means of which the extent of movement of the control device of the A-end or pump 24 may be regulated to secure any desired speed of travel of the planer table 12 in its forward and reverse travel.

The employment of hydraulic speed gears for driving the table 12 of the machine for driving the milling cutter 83 and for driving both the vertical and horizontal feed screws results in the production of a combined planing and milling machine capable of operating at the highest possible efficiency. The speed of travel of the work table 12 can be adjusted with the utmost accuracy. Likewise the speed of rotation of the milling cutter and the feed of the milling head either transversely of the cross head 70, or vertically, can also be adjusted with great accuracy and precision. The present invention is therefore a marked improvement over prior art devices wherein speed changes are effected by means of multiple gear installations in which but a limited amount of different speeds of the driving parts can be secured. With the present invention the number of adjustments or variations of speed of rotation of the milling cutter to rate of feed of the work is infinite because of the fact that the speed of each one of the plurality of hydraulic speed gears which are co-operatively associated in the unitary structure disclosed may be varied infinitely from zero to the full rated capacity of each respective gear. As it is possible to set these hydraulic gears so that a very slow speed of rotation of the driving shaft of the motor of each gear can be secured, the feed of either the planer tool or milling tool may be adjusted so that a very slow movement of the tool into the work may be effected gradually without producing a step-by-step movement of the tool such as characterizes tools wherein the feed of the tool is effected by means of toothed gears. Owing to the fact that the work table is driven by a fluid pressure motor having a rotatable driving shaft, the jerky motion present in piston and cylinder hydraulic driving devices is obviated.

While the machine disclosed in the present application forms a satisfactory and successful commercial application of the principles of the invention, it will be understood that the invention is not limited to the specific constructional example herein shown, but that many changes, variations and modifications may be resorted to without departing from such principles.

It will be understood that both the milling tool head and the planer tool head are operated by variable speed hydraulic gears (the planer tool head by the same gear which actuates the planer table), and that, as to each head, either the vertical or the transverse feeding is obtained selectively from the motor of the respective hydraulic gear.

The planer reversing apparatus would probably be disconnected during milling operations.

I claim:
1. The combination, with a machine tool of the planer type having a reciprocating work table, of means for driving said table, said means comprising a fluid pressure pump having an adjustable device for varying the volume, or reversing the direction, of its output, a fluid pressure motor having a rotary driv- ing shaft, and gearing connecting the driving shaft of said motor with said work table.

2. The combination, with a machine tool of the planer type having a reciprocating work table, of means for driving said table, said means comprising a fluid pressure pump having an adjustable device for varying the volume, or reversing the direction, of its output, a fluid pressure motor having a rotary driving shaft, and gearing connecting the driving shaft of said motor with said work table and adjustable means operated by the reciprocation of said table for causing reversal of the direction of rotation of said fluid pressure motor.

3. The combination, with a machine tool of the planer type having a reciprocating work table, of hydraulic means for driving said table, said means comprising a fluid pressure pump having an adjustable device for varying the volume, or reversing the direction, of its output, a fluid pressure motor having a rotary driving shaft, and gearing connecting the driving shaft of said motor with said work table, said machine tool having a cross head, a tool carrying head mounted on said cross head, feeding means for producing transverse or vertical movement of said tool head relatively to said work table, and a device for driving said feeding means from the variable hydraulic drive of the reciprocating table.

4. The combination, with a machine tool of the planer type having a reciprocating work table, of hydraulic means for driving said table, said means comprising a fluid pressure pump having an adjustable device for varying the volume, or reversing the direction, of its output, a fluid pressure motor having a rotary driving shaft, and gearing connecting the driving shaft of said motor with said work table, said machine tool having a cross head, a pair of tool carrying heads mounted on said cross head in co-operative relation to said reciprocating work table, feeding means for one of said tool carrying heads including a variable hydraulic speed gear, and feeding means for the other tool carrying head, said second-named feeding means being operatively connected with the variable hydraulic drive of the reciprocating table.

5. The combination, with a machine tool of the planer type having a reciprocating work table, of hydraulic means for driving said table, said means comprising a fluid pressure pump having an adjustable device for varying the volume, or reversing the direction, of its output, a fluid pressure motor having a rotary driving shaft, and gearing connecting the driving shaft of said motor with said work table, said machine tool having a cross head, a pair of tool carrying heads mounted on said cross head in co-operative relation to said reciprocating work table, and feeding means for selectively producing vertical or transverse movement of either of said tool carrying heads relatively to said work table, the feeding means of the one tool carrying head including a variable hydraulic speed gear, and the feeding means of the reciprocating tool carrying head being operatively connected with the variable hydraulic drive of the planer table.

6. The combination, with a machine tool of the planer type having a reciprocating work table, of means for driving said table, said means comprising a fluid pressure pump having an adjustable device for varying the volume, or reversing the direction, of its output, a fluid pressure motor having a rotary driving shaft, and gearing connecting the driving shaft of said motor with said work table, said gearing including a change speed gear reduction having a one-to-one drive speed ratio and a greatly reduced back gear speed ratio, and manually operable means for selectively making either of the gear ratios of said gear reduction operative.

7. The combination, with a machine tool of the planer type having a reciprocating work table, of means for driving said table, said means comprising a fluid pressure pump having an adjustable device for varying the volume, or reversing the direction, of its output, a fluid pressure motor having a rotary driving shaft, and gearing connecting the driving shaft of said motor with said work table, said machine tool having a cross head, a pair of tool carrying heads mounted on said cross head in co-operative relation to said reciprocating work table, feeding means for one of said tool carying heads, feeding means for the other of said tool carrying heads including a variable hydraulic speed gear, and another hydraulic speed gear including a fluid pressure pump and a fluid pressure motor, the latter being provided with a rotary driving shaft, and gearing connecting the last named rotary driving shaft with said other tool carrying head for rotating the tool thereof.

8. The combination, with a machine tool having a cross head and a work table mounted for reciprocation relatively to said cross head, of a pair of tool carrying heads carried by said cross head in co-operative relation to said reciprocating work table, and a plurality of hydraulic speed gears, each including a fluid pressure pump and a fluid pressure motor having a rotary driving shaft, the motor of one of said speed gears driving said work table and effecting selectively either vertical or transverse feeding of one of said carrying heads, the motor of another speed gear effecting selectively either vertical or transverse feeding of the other tool carrying head, and the motor of a third speed gear driving the tool of said other tool carrying head.

9. The combination, with a machine tool having a cross head and a work carrying table reciprocable relatively to said cross head, of a pair of tool carrying heads mounted on said cross head, a hydraulic speed gear for driving said table, said gear including a fluid pressure pump and a fluid pressure motor, said motor having a rotary driving shaft and said pump having an adjustable device for varying its output and reversing the direction of flow therethrough, gearing including a reduction gear of at least two different speed ratios connecting the driving shaft of said motor with said work table for driving the latter, manually operable means for placing either of said gear ratios of said reduction gear selectively in driving relationship with said work table, reversing means operated by the reciprocation of said table for actuating the adjustable device of said pump for effecting reversals of the direction of its output whereby said table is reciprocated in a predetermined manner, a manually operable hand wheel for setting said adjustable device in adjusted position for operating said table in another predetermined manner, and means for selectively placing said reversing means or said hand wheel in operative relationship with said adjustable device.

10. A combination as set forth in claim 9, in which the means for selectively placing the reversing means or the hand wheel in operative relationship includes a double clutch having three set positions in one of which positions neither the reversing means nor the hand wheel is operative, while in the other two positions of the clutch the hand wheel or the reversing means is operative and the reversing means or the hand wheel respectively is inoperative.

11. The combination with a machine tool having a cross head and a work table mounted for reciprocation relatively to said cross head, of a tool carrying head carried by said cross head, a hydraulic speed gear including a fluid pressure pump having an adjustable device for varying its output or reversing the direction of flow therethrough, and a fluid pressure motor having a rotatable driving shaft, gearing including a change speed reduction gear for driving said work table from said rotary shaft, and a second hydraulic gear comprising a pump and motor similar to the first mentioned motor, and gearing connecting said last named motor with the tool carrying head to rotate the tool thereof.

In testimony whereof I have hereunto set my hand.

ARTHUR L. ELLIS.